(12) United States Patent
Li et al.

(10) Patent No.: US 11,348,275 B2
(45) Date of Patent: May 31, 2022

(54) METHODS AND APPARATUSES FOR DETERMINING BOUNDING BOX OF TARGET OBJECT, MEDIA, AND DEVICES

(71) Applicant: Beijing Sensetime Technology Development Co. Ltd., Beijing (CN)

(72) Inventors: Buyu Li, Beijing (CN); Quanquan Li, Beijing (CN); Junjie Yan, Beijing (CN)

(73) Assignee: BEIJING SENSETIME TECHNOLOGY DEVELOPMENT CO. LTD., Beijing (CN)

( * ) Notice: Subject to any disclaimer, the term of this patent is extended or adjusted under 35 U.S.C. 154(b) by 0 days.

(21) Appl. No.: 16/731,858

(22) Filed: Dec. 31, 2019

(65) Prior Publication Data

US 2020/0134859 A1    Apr. 30, 2020

Related U.S. Application Data

(63) Continuation of application No. PCT/CN2018/111464, filed on Oct. 23, 2018.

(30) Foreign Application Priority Data

Nov. 21, 2017    (CN) .......................... 201711165979.8

(51) Int. Cl.
*G06K 9/00* (2022.01)
*G06T 7/73* (2017.01)
(Continued)

(52) U.S. Cl.
CPC .................. *G06T 7/73* (2017.01); *G06N 3/08* (2013.01); *G06V 10/462* (2022.01);
(Continued)

(58) Field of Classification Search
CPC ............ G06K 9/00369; G06K 9/3233; G06K 9/4671; G06K 9/6271; G06N 3/0454;
(Continued)

(56) References Cited

U.S. PATENT DOCUMENTS 9,177,225 B1 * 11/2015 Cordova-Diba ... G06K 9/00671
9,767,381 B2    9/2017 Rodriguez-Serrano et al.
(Continued)

FOREIGN PATENT DOCUMENTS

CN    107194338 A    9/2017
CN    107194361 A    9/2017
(Continued)

OTHER PUBLICATIONS

PCT International Search Report relating to International Appln. No. PCT/CN2018/111464, dated Jan. 27, 2019, 4 pages.

*Primary Examiner* — Xin Jia
(74) *Attorney, Agent, or Firm* — BakerHostetler

(57) ABSTRACT

Embodiments of the present application disclose methods and apparatuses for determining a bounding box of a target object, media, and devices. The method includes: obtaining attribute information of each of a plurality of key points of a target object; and determining a bounding box position of the target object according to the attribute information of each of the plurality of key points of the target object and to a preset neural network. The implementations of the present application can improve the efficiency and accuracy of determining a bounding box of a target object.

13 Claims, 2 Drawing Sheets

(51) Int. Cl.
*G06N 3/08* (2006.01)
*G06V 10/46* (2022.01)
*G06V 40/10* (2022.01)

(52) U.S. Cl.
CPC .. *G06V 40/103* (2022.01); *G06T 2207/30196* (2013.01); *G06T 2210/12* (2013.01)

(58) Field of Classification Search
CPC ............... G06N 3/0481; G06N 3/08; G06T 2207/20076; G06T 2207/20081; G06T 2207/20084; G06T 2207/30196; G06T 2210/12; G06T 7/73
See application file for complete search history.

(56) References Cited

U.S. PATENT DOCUMENTS

| | | |
|---|---|---|
| 2012/0020519 A1 | 1/2012 | Yashiro |
| 2015/0228077 A1* | 8/2015 | Menashe ................ G06K 9/52 382/103 |
| 2016/0300121 A1* | 10/2016 | Chertok ................. G06N 3/04 |
| 2017/0098123 A1 | 4/2017 | Tamatsu et al. |
| 2017/0169313 A1 | 6/2017 | Choi et al. |
| 2017/0293824 A1 | 10/2017 | Chen et al. |
| 2019/0096086 A1* | 3/2019 | Xu ..................... G06K 9/00791 |
| 2020/0380288 A1* | 12/2020 | Yang ................... G06K 9/3233 |

FOREIGN PATENT DOCUMENTS

| | | |
|---|---|---|
| CN | 107220604 A | 9/2017 |
| CN | 108229305 A | 6/2018 |
| JP | 2017-520859 A | 7/2017 |
| WO | WO 2016/179808 A1 | 11/2016 |
| WO | WO 2017/095948 A1 | 6/2017 |

* cited by examiner

METHODS AND APPARATUSES FOR DETERMINING BOUNDING BOX OF TARGET OBJECT, MEDIA, AND DEVICES

The present application is a bypass continuation of and claims priority under 35 U.S.C. § 111(a) to PCT Application. No. PCT/CN/2018/111464, filed on Oct. 23, 2018, which claims priority to Chinese Patent Application No. CN201711165979.8, filed with the Chinese Patent Office on Nov. 21, 2017, and entitled "METHODS AND APPARATUSES FOR DETERMINING BOUNDING BOX OF TARGET OBJECT, MEDIA, AND DEVICES", both of which are incorporated herein by reference in their entirety.

TECHNICAL FIELD

The present application relates to computer vision technologies, and in particular, to methods and apparatuses for determining a bounding box of a target object, electronic devices, and computer storage media.

BACKGROUND

In the field of computer vision such as image recognition, it is often necessary to quickly and accurately determine a bounding box of a human body.

At present, a Faster Region-based Convolutional Neural Network (Faster-RCNN) is usually used for determining a bounding box of a human body. That is, a Region Proposal Network (RPN) is first used for obtaining a plurality of candidate regions, and an RCNN is then used for scoring and correcting the respective candidate regions, so as to determine a bounding box of a human body. However, the accuracy of determining a bounding box of a human body is to be further improved.

SUMMARY

Embodiments of the present application provide technical solutions for determining a bounding box of a target object.

A method for determining a bounding box of a target object provided according to one aspect of the embodiments of the present application includes: obtaining attribute information of each of a plurality of key points of a target object; and determining a bounding box position of the target object according to the attribute information of each of the plurality of key points of the target object and to a preset neural network.

Optionally, in one implementation of the method of the present application, the target object includes a human body.

Optionally, in another implementation of the method of the present application, the attribute information of the key point includes coordinate information and a presence determination value.

Optionally, in one implementation of the method of the present application, the determining a bounding box position of the target object according to the attribute information of each of the plurality of key points of the target object and to a preset neural network includes: determining at least one valid key point from the plurality of key points according to the attribute information of each of the plurality of key points; processing, according to the attribute information of each of the at least one valid key point, the attribute information of the plurality of key points to obtain processed attribute information of the plurality of key points; and inputting the processed attribute information of the plurality of key points to the preset neural network for processing to obtain the bounding box position of the target object.

Optionally, in one implementation of the method of the present application, the processed attribute information of the plurality of key points includes processed attribute information of each of the at least one valid key point and attribute information of key points other than the at least one valid key point in the plurality of key points.

Optionally, in one implementation of the method of the present application, the processing, according to the attribute information of each of the at least one valid key point, the attribute information of the plurality of key points to obtain processed attribute information of the plurality of key points includes: determining a reference coordinate according to coordinate information included in the attribute information of each of the at least one valid key point; and determining coordinate information in the processed attribute information of each valid key point according to the reference coordinate and to the coordinate information in the attribute information of each of the at least one valid key point.

Optionally, in one implementation of the method of the present application, the determining a reference coordinate according to coordinate information included in the attribute information of each of the at least one valid key point includes performing averaging processing on coordinates corresponding to the coordinate information of each of the at least one valid key point to obtain the reference coordinate, and/or the determining coordinate information in the processed attribute information of each valid key point according to the reference coordinate and to the coordinate information in the attribute information of each of the at least one valid key point includes determining, with the reference coordinate as an origin point, processed coordinate information corresponding to the coordinate information of each of the at least one valid key point.

Optionally, in one implementation of the method of the present application, the inputting the processed attribute information of the plurality of key points to the preset neural network for processing to obtain the bounding box position of the target object includes: inputting the processed attribute information of the plurality of key points to the preset neural network for processing to obtain output position information; and determining the bounding box position of the target object according to the reference coordinate and the output position information.

Optionally, in one implementation of the method of the present application, the method further includes: obtaining a sample set including a plurality pieces of sample data, where the sample data includes attribute information of a plurality of key points of a sample object, and the sample data is annotated with a bounding box position of the sample object; and training the neural network according to the attribute information of the plurality of key points of the sample object in each piece of sample data and to the bounding box position of the sample object.

Optionally, in one implementation of the method of the present application, the neural network is obtained by performing training on the basis of a stochastic gradient descent algorithm.

Optionally, in one implementation of the method of the present application, the bounding box position of the target object includes coordinate information of two vertexes in a diagonal direction of the bounding box of the target object.

Optionally, in one implementation of the method of the present application, the neural network includes at least two full connection layers.

Optionally, in one implementation of the method of the present application, the neural network includes three full connection layers, where an activation function of at least one of the first full connection layer and the second full connection layer of the three full connection layers includes a Rectified Linear Unit (ReLu) activation function.

Optionally, in one implementation of the method of the present application, the first full connection layer includes 320 neurons, the second full connection layer includes 320 neurons, and the last of the three full connection layers includes 4 neurons.

An apparatus for determining a bounding box of a target object provided according to another aspect of the embodiments of the present application includes: an obtaining module configured to obtain attribute information of each of a plurality of key points of a target object; and a determining module configured to determine a bounding box position of the target object according to the attribute information of each of the plurality of key points of the target object and to a preset neural network.

Optionally, in one implementation of the apparatus of the present application, the target object includes a human body.

Optionally, in another implementation of the apparatus of the present application, the attribute information of the key point includes coordinate information and a presence determination value.

Optionally, in a further implementation of the apparatus of the present application, the determining module includes: a first sub-module configured to determine at least one valid key point from the plurality of key points according to the attribute information of each of the plurality of key points obtained by the obtaining module; a second sub-module configured to process, according to attribute information of each of the at least one valid key point determined by the first sub-module, the attribute information of the plurality of key points to obtain processed attribute information of the plurality of key points; and a third sub-module configured to input the processed attribute information of the plurality of key points obtained by the second sub-module to the preset neural network for processing to obtain the bounding box position of the target object.

Optionally, in a further implementation of the apparatus of the present application, the processed attribute information of the plurality of key points includes processed attribute information of each of the at least one valid key point and attribute information of key points other than the at least one valid key point in the plurality of key points.

Optionally, in a further implementation of the apparatus of the present application, the second sub-module includes: a first unit configured to determine a reference coordinate according to coordinate information included in the attribute information of each of the at least one valid key point determined by the first sub-module; and a second unit configured to determine coordinate information in the processed attribute information of each valid key point according to the reference coordinate determined by the first unit and to the coordinate information in the attribute information of each of the at least one valid key point.

Optionally, in a further implementation of the apparatus of the present application, the first unit is configured to perform averaging processing on coordinates corresponding to the coordinate information of each of the at least one valid key point determined by the first sub-module to obtain the reference coordinate, and/or the second unit is configured to determine, with the reference coordinate determined by the first unit as an origin point, processed coordinate information corresponding to the coordinate information of each of the at least one valid key point.

Optionally, in a further implementation of the apparatus of the present application, the third sub-module is configured to: input the processed attribute information of the plurality of key points obtained by the second sub-module to the preset neural network for processing to obtain output position information; and determine the bounding box position of the target object according to the reference coordinate and the output position information.

Optionally, in a further implementation of the apparatus of the present application, the apparatus further includes a training module configured to: obtain a sample set including a plurality pieces of sample data, where the sample data includes attribute information of a plurality of key points of a sample object, and the sample data is annotated with a bounding box position of the sample object; and train the neural network according to the attribute information of the plurality of key points of the sample object in each piece of sample data and to the bounding box position of the sample object.

Optionally, in a further implementation of the apparatus of the present application, the neural network is obtained by performing training on the basis of a stochastic gradient descent algorithm.

Optionally, in a further implementation of the apparatus of the present application, the bounding box position of the target object includes coordinate information of two vertexes in a diagonal direction of the bounding box of the target object.

Optionally, in a further implementation of the apparatus of the present application, the neural network includes at least two full connection layers.

Optionally, in a further implementation of the apparatus of the present application, the neural network includes three full connection layers, where an activation function of at least one of the first full connection layer and the second full connection layer of the three full connection layers includes a Rectified Linear Unit (ReLu) activation function. The first full connection layer includes 320 neurons, the second full connection layer includes 320 neurons, and the last of the three full connection layers includes 4 neurons.

An electronic device provided according to a further aspect of the embodiments of the present application includes a processor and a computer-readable storage medium, where the computer-readable storage medium is configured to store instructions, and when the processor executes the instructions, the electronic device executes any of the implementations of the method.

A computer program product provided according to a further aspect of the embodiments of the present application includes at least one instruction, where when the at least one instruction is executed by a processor, any of the implementations of the method is executed.

In an optional implementation, the computer program product is a computer storage medium. In another optional implementation, the computer program product is a software product, such as SDK.

By determining a bounding box position of a target object according to attribute information of each of a plurality of key points of the target object and to a preset neural network, the methods and apparatuses for determining a bounding box of a target object, electronic devices, and computer program products provided in the foregoing implementations of the present application facilitate improving the efficiency and accuracy of determining a bounding box of a target object.

The following further describes in detail the technical solutions of the present application with reference to the accompanying drawings and implementations.

BRIEF DESCRIPTION OF THE DRAWINGS

The accompanying drawings constituting a part of the specification describe the embodiments of the present application and are intended to explain the principles of the present application together with the descriptions.

According to the following detailed descriptions, the present application can be understood more clearly with reference to the accompanying drawings.

DETAILED DESCRIPTIONS

Figure 1:
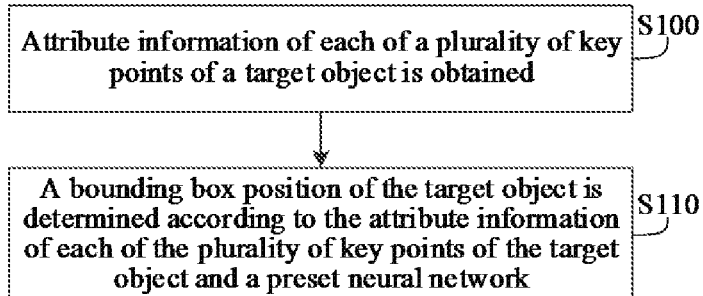
FIG. 1 is a flowchart of a method for determining a bounding box of a target object in some implementations of the present application.

Various exemplary implementations of the present application are now described in detail with reference to the accompanying drawings. It should be noted that, unless otherwise stated specifically, relative arrangement of the components and steps, the numerical expressions, and the values set forth in the implementation modes are not intended to limit the scope of the present application.

In addition, it should be understood that, for ease of description, the size of each section shown in the accompanying drawings is not drawn in an actual proportion.

The following descriptions of at least one exemplary implementation are merely illustrative actually, and are not intended to limit the present application and the applications or uses thereof.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The implementations of the present application may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked by means of a communications network. In the distributed computing environments, the program modules may be located in local or remote computing system storage media including storage devices.

FIG. 1 is a flowchart of a method for determining a bounding box of a target object in some implementations of the present application. As shown in FIG. 1, the method for determining a bounding box of a target object of the present application includes S100 and S110. The operations in FIG. 1 are separately described as follows.

At S100, attribute information of each of a plurality of key points of a target object is obtained.

In an optional example, the target object in the implementations of the present application may also be referred to as a detection object, a bounding box detection object, or the like, and no limitation is made thereto in the embodiments of the present application. Optionally, the target object may be a human body, or may be a human face or a particular object. The implementations of the present application do not limit the representation manner of the target object. The bounding box in the implementations of the present application generally indicates a polygon (generally a rectangle) capable of representing a region in which a target object is located, and generally, the bounding box can accurately cover all parts of the target object and has an area as small as possible.

In an optional example, the attribute information of the key point in the implementations of the present application includes various information of the key point. As an example, the attribute information of the key point is used for describing whether the key point of the target object is visible in an image, and the position of the key point in the image, where the key point is visible in the image. In the implementations of the present application, a key point visible in an image (i.e., a key point that is located within the image) is referred to as a valid key point, and a key point invisible in the image (i.e., a key point that is not located within the image) is referred to as an invalid key point. The key point invisible in the image may be a blocked key point, or may be a key point outside the image. No limitation is made thereto in the embodiments of the present application.

In an optional example, the attribute information of the key point includes coordinate information of the key point and a presence determination value of the key point. The coordination information of the key point is used for representing the position of the key point in the image. For example, the coordinate information of the key point is two-dimensional coordinates of the key point. However, the embodiments of the present application are not limited thereto. The presence determination value of the key point is used for indicating whether the key point is visible in the image. For example, if the presence determination value of the key point is 1, it indicates that the key point is visible, and if the presence determination value of the key point is 0, it indicates that the key point is invisible. However, the presence determination value in the embodiments of the present application may be implemented in other manners, and no limitation is made thereto in the embodiments of the present application. Optionally, the attribute information may also include other information. The embodiments of the present application are not limited thereto.

As an example, the attribute information of the key point obtained in the implementations of the present application is a 3×N-dimensional vector, where N indicates the number of key points preset for the target object. The attribute information of one key point in the implementations of the present application is represented by an array (x, y, v), where x and y are two-dimensional coordinates of the key point in the image respectively, and v is the presence determination value of the key point. If the value of v is a first determination value, it indicates that the key point is a visible key point in the image, and if the value of v is a second determination value, it indicates that the key point is an invisible key point in the image. For example, for one key point of the target object, if the key point is a valid key point, the attribute information of the key point is represented as an array (x, y, 1), and if the key point is an invalid key point (being blocked or being outside the image), the attribute information of the key point is represented as an array (0, 0, 0). By representing the attribute information of the key point in such a way, the actual states of all key points of the target object in the image can be conveniently acquired.

In an optional example, in the case that the target object is a human body, the key points of the human body in the implementations of the present application generally include the head top, the neck, the left shoulder, the right shoulder, the left elbow, the right elbow, the left wrist, the right wrist, the left hip, the right hip, the left knee, the right knee, the left ankle, and the right ankle. These 14 key points can be used for comprehensively describe the gestures and postures of the human body. In this case, the attribute information of the plurality of key points includes the attribute information of some or all of the 14 key points. As an example, the attribute information of the plurality of key points obtained in the implementations of the present application includes: coordination information of the head top and a presence determination value of the head top, coordination information of the neck and a presence determination value of the neck, coordination information of the left shoulder and a presence determination value of the left shoulder, coordination information of the right shoulder and a presence determination value of the right shoulder, coordination information of the left elbow and a presence determination value of the left elbow, coordination information of the right elbow and a presence determination value of the right elbow, coordination information of the left wrist and a presence determination value of the left wrist, coordination information of the right wrist and a presence determination value of the right wrist, coordination information of the left hip and a presence determination value of the left hip, coordination information of the right hip and a presence determination value of the right hip, coordination information of the left knee and a presence determination value of the left knee, coordination information of the right knee and a presence determination value of the right knee, coordination information of the left ankle and a presence determination value of the left ankle, coordination information of the right ankle and a presence determination value of the right ankle. The attribute information of these 14 key points can be used for describing general configuration of a human body in an image. In the case that the target object is another object, the key points thereof generally change along with the object. The implementations of the present application do not limit the representation manner of the key points of the target object.

In an optional example, the implementations of the present application are applicable to an application scenario where the attribute information of the plurality of key points of the target object has been obtained. That is to say, in an application scenario where the attribute information of the plurality of key points of the target object has been obtained from an image or by means of other manners, in the implementations of the present application, the attribute information of the key points of the target object is obtained by means of information reading or the like. In one example, a key point detecting process can be performed on an image including the target object to obtain the information of the plurality of key points of the target object. In another example, the information of the plurality of key points can be received from the other apparatus. However, the embodiments of the present application are not limited thereto. In such an application scenario, the implementations of the present application obtain, by using a pre-trained neural network, a bounding box position of the target object according to the attribute information of the plurality of key points of the target object.

In an optional example, S100 may be executed by a processor by invoking corresponding instructions stored in a memory, or may be executed by an obtaining module 300 run by the processor.

At S110, a bounding box position of the target object is determined according to the attribute information of each of the plurality of key points of the target object and to a preset neural network.

Optionally, the bounding box position of the target object is used for determining a bounding box of the target object. Optionally, the bounding box position includes position information of one or more vertexes of a bounding box. In an optional example, if the bounding box is a quadrilateral, for example, the quadrilateral is a rectangle, the bounding box position includes positional information of two opposite vertexes of the bounding box, for example, two-dimensional coordinates of each of the two opposite vertexes. However, the embodiments of the present application do not limit the implementation of the bounding box position of the target object.

In an optional example, the neural network in the implementations of the present application is a special-purpose neural network. The neural network is trained using a large amount of sample data, where the sample data includes attribute information of a plurality of key points and a bounding box position of a sample object. That is to say, the sample data is annotated with the bounding box position of the sample object. Reference may be made to the descriptions for FIG. 2 for an optional example of the training process, and descriptions are not made herein repeatedly.

Optionally, the neural network in the implementations of the present application includes at least two full connection layers. Compared with a convolutional neural network, a full connection network has a faster computing speed and higher processing efficiency.

In an optional example, the neural network in the implementations of the present application includes two full connection layers, and an activation function of the first full connection layer is a Rectified Linear Unit (ReLu) activation function.

In an optional example, the neural network in the implementations of the present application includes three full connection layers, where the activation function of the first full connection layer is an ReLu activation function, and the activation function of the second full connection layer is also an ReLu activation function.

In the embodiments of the present application, the number of the full connection layers included in the neural network and the number of neurons included in each full connection layer may be set according to actual situations. In the case that the neural network has enough layers and neurons, the neural network has a strong function expression capability, such that the bounding box position obtained on the basis of the neural network is more accurate. In an optional example, for the neural network formed by three full connection layers, the number of the neurons of the first full connection layer is 320, and the number of the neurons of the second full connection layer is also 320. In the case that the bounding box of the target object is a quadrilateral (for example, a rectangle), and the bounding box position of the target object is represented by two-dimensional coordinate information of two vertexes in the diagonal direction of the bounding box, the number of the neurons of the third full connection layer is set as 4.

It is verified by multiple experiments that, the neural network having three full connection layers, where ReLu activation functions are used as the activation functions of the first full connection layer and the second full connection layer, the first full connection layer and the second full connection layer respectively have 320 neurons, and the third full connection layer has 4 neurons, not only has an operational speed that can meet actual requirements, but also determines a bounding box position with an accuracy meeting the actual requirements.

In an optional example, S110 may be performed by a processor by invoking corresponding instructions stored in a memory, or may be performed by a determining module 310 run by the processor.

In the embodiments of the present application, the attribute information of the plurality of the key points is directly input to the neural network, or the attribute information of the plurality of key points is input to the neural network after being processed. That is to say, input information of the neural network is determined according to the attribute information of the plurality of key points, where the input information is the attribute information of the plurality of key points per se, or is obtained by processing the attribute information of the plurality of key points. The neural network processes the input information to obtain an output result, where the bounding box position of the target object is obtained according to the output result of the neural network. Optionally, the output result of the neural network includes the positional information of the bounding box of the target object, such as, for example, coordination information of one or more vertexes of the bounding box of the target object. As an example, if the bounding box is a rectangle, the output result includes coordinate information of two opposite vertexes of the bounding box, or the bounding box position of the target object is obtained by processing the output result of the neural network. No limitation is made thereto in the embodiments of the present application.

In an optional example, the present application selects a valid key point according to the attribute information of each of the plurality of key points of the target object. For example, if the attribute information of the key point includes a presence determination value, a key point indicated being present by the presence determination value is determined as a valid key point. For example, if the presence determination value of the key point is 1, the key point is determined as a valid key point. However, the embodiments of the present application are not limited thereto.

Optionally, if at least one valid key point is selected from the plurality of key points, the attribute information of some or all of the plurality of key points is processed according to the attribute information of each of the at least one valid key point, to obtain processed attribute information of the plurality of key points, and the processed attribute information of the plurality of key points is used as input information. Optionally, the processed attribute information of the plurality of key points includes the processed attribute information of each of the plurality of key points, or includes the processed attribute information of one part of the plurality of key points and the original attribute information of the other part of the plurality of key points. As an example, the processed attribute information of the plurality of key points includes processed attribute information of each of the at least one valid key point and original attribute information of key points other than the at least one valid key point in the plurality of key points. That is to say, the attribute information of each of the at least one valid key point is processed, and the attribute information of the other key points is not processed. However, the embodiments of the present application are not limited thereto.

In the embodiments of the present application, the attribute information of the at least one valid key point may be processed with various manners. As an example, reference coordinates are determined according to the coordinate information included in the attribute information of each of the at least one valid key point, and coordinate information in the processed attribute information of the valid key point is determined according to the reference coordinates and the coordinate information in the attribute information of the valid key point. The reference coordinates are obtained by processing the coordinate information of the at least one valid key point. For example, the reference coordinates are obtained by performing averaging processing on the coordinates of the at least one valid key point. However, the embodiments of the present application do not limit the implementation of the reference coordinates.

In an optional example, zero-mean processing is performed on the attribute information of the key points obtained at S100, and the information obtained after the zero-mean processing is provided to the neural network as a portion of the input information. For example, a coordinate mean $(m_x, m_y)$ is calculated according to the coordinate information in the attribute information of the valid key points. Then, for each valid key point in all the key points, a difference between the coordinate information $(x_i, y_i)$ of the key point and the coordinate mean, i.e., $(x_i-m_x, y_i-m_y)$, is calculated, and the calculated difference is used as coordinate information of the valid key point. At last, the coordinate information of all the key points of the target object and the presence determination values of all the key points are provided to the neural network as input information.

It should be particularly noted that, in the implementations of the present application, if zero-mean processing is not performed on the sample data during a process of training a neural network, then zero-mean processing is also not needed to be performed on the two-dimensional coordinates of the valid key point of the target object at S110.

Optionally, in the case that the input information provided to the neural network is input information obtained through zero-mean processing, in the implementations of the present application, a sum of the coordinate information output by the neural network and the calculated coordinate mean is taken as the final coordinates of a plurality of vertexes of the bounding box of the target object (for example, two vertexes on a diagonal line of a rectangular bounding box). For example, if the output position information of the neural network is ($bx_1$, $by_1$) and ($bx_2$, $by_2$), the coordinates of the two vertexes on the diagonal line of the bounding box of the target object are ($bx_1+m_x$, $by_1+m_y$) and ($bx_2+m_x$, $by_2+m_y$).

Figure 2:
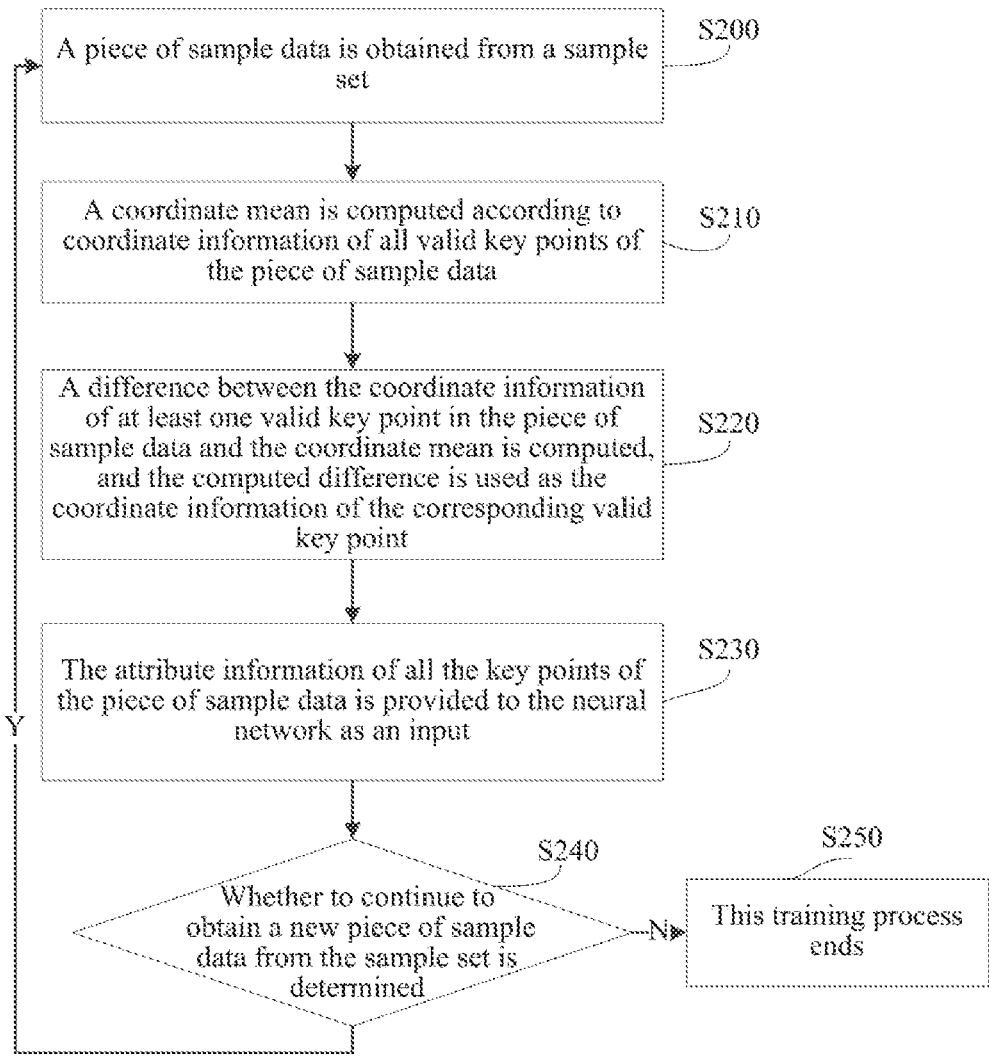
FIG. 2 is a flowchart of a method for training a neural network in some implementations of the present application.

FIG. 2 is a flowchart of a method for training a neural network in some implementations of the present application. Here, it is assumed that the number of the plurality of key points is N, the attribute information of each key point is a three-dimensional vector (x, y, v), and the bounding box is a rectangle. In addition, it is assumed that an input of the neural network includes a 3×N matrix and an output thereof includes a 2×2 matrix, and the input and output are two-dimensional coordinates of the two vertexes of the diagonal line of the bounding box.

As shown in FIG. 2, the method for training a neural network in the implementations of the present application includes S200, S210, S220, S230, S240 and S250. The operations in FIG. 2 are separately described as follows.

At S200, a piece of sample data is obtained from a sample set.

In an optional example, the sample set in the implementations of the present application is generally non-empty, and generally includes a large amount of sample data. For example, the sample set may be the currently published MS COCO database and/or the like. Each piece of sample data in the sample set includes attribute information of a plurality of key points of a sample object, and each piece of sample data is annotated with a bounding box position of the sample object, where the attribute information of the key point includes coordinate information of the key point and a presence determination value of the key point. However, the embodiments of the present application are not limited thereto. The sample object corresponding to the sample data generally has a same type as the target object. For example, in the case that the target object is a human body, the sample object is also a human body. In the implementations of the present application, a piece of sample data may be sequentially selected from the sample set according to an arrangement order of the sample data, or may be randomly selected from the sample set. The embodiments of the present application do not limit the mode of selecting the sample data.

At S210, a coordinate mean is calculated according to coordinate information of all valid key points of the piece of sample data.

For example, a coordinate means ($m_x$, $m_y$) is calculated for the coordinate information in the attribute information of all the key points having a presence determination value of 1 in the sample data.

At S220, a difference between the coordinate information of at least one valid key point in the piece of sample data and the coordinate mean is calculated, and the calculated difference is used as the coordinate information of the corresponding valid key point.

For example, ($x_i-m_x$, $y_i-m_y$) is calculated for the coordinate information ($x_i$, $y_i$) of the valid key point in the sample data.

At S230, the attribute information of all the key points of the piece of sample data is provided to the neural network as an input.

In an optional example, in the case that the outputs of the neural network are two-dimensional coordinates ($bx_1$, $by_1$) and ($bx_2$, $by_2$) of the two vertexes on the diagonal line of the rectangle, the coordinates of the bounding box is determined as a sum of the output coordinate information and the coordinate means (i.e., given supervision), and are represented as ($bx_1+m_x$, $by_1+m_y$) and ($bx_2+m_x$, $by_2+m_y$).

Optionally, in the implementations of the present application, calculation is performed by means of a stochastic gradient descent algorithm, so as to implement training.

Optionally, the result computed by the neural network and the annotated bounding box position of the sample data are compared to determine whether to adjust a parameter of the neural network. If the deviation between the result computed by the neural network and the annotated bounding box position of the sample data is lower than a given range, the training process is terminated or a new piece of sample data is continued to be selected from the sample set. Otherwise, the parameter of the neural network is adjusted, and the adjusted neural network is used for continuing the calculation.

At S240, whether to continue to obtain a new piece of sample data from the sample set is determined.

If it is needed to continue to obtain a new piece of sample data from the sample set, return to S200, or otherwise, go to S250.

In an optional example, in the implementations of the present application, whether to continue to obtain a new piece of sample data from the sample set is determined through determining whether all pieces of sample data in the sample set have been used for training, whether the result output by the neural network satisfies a predetermined accuracy requirement, whether the number of samples having been read reaches a predetermined number or the like.

At S250, the present training process ends.

In an optional example, upon detection, in the case that it is determined that the result output by the neural network satisfies a predetermined accuracy requirement, the neural network is successfully trained. However, if all pieces of sample data in the sample set have been used for training or the number of samples having been read reaches a predetermined number, while it is determined, by means of detection, that the result output by the neural network still does not satisfy the predetermined accuracy requirement, the neural network is not successfully trained even though the present training process ends, and the neural network may be trained again. The above detection may be: selecting, from the sample set, a plurality pieces of untrained sample data, providing such sample data to the neural network according to the method shown in FIG. 1, and determining an error between at least one bounding box position obtained by the neural network and the bounding box position manually annotated in the corresponding sample data. When it is determined according to at least one error that the accuracy satisfies the predetermined accuracy requirement, the neural network is successfully trained. In addition, during the process of training the neural network in the implementations of the present application, an L2 loss function may be used for training supervision. However, the embodiments of the present application are not limited thereto.

The present application trains the neural network using the attribute information of the key points and the bounding box position of the sample object, such that the trained neural network is able to directly determine the bounding box position of the target object on the basis of the attribute information of the key points of the target object. Because cases where the attribute information of the key points of the target object has been obtained exist in some actual applications, the implementations of the present application can quickly obtain the bounding box of the target object by fully using the obtained attribute information of the key point of the target object, without using an image. Because the neural network in the implementations of the present application is obtained by performing training using the attribute information of the key point and the bounding box position of the sample object, in the case that the number of the key points of the sample object and the set number of the neurons are large, the neural network also needs to learn a large number of parameters. This helps the neural network accurately determine the bounding box of the target object.

Any method provided by the embodiments of the present application is executed by any appropriate device having data processing capability, including, but not limited to, a terminal device and a server. Alternatively, any method provided in the embodiments of the present application is executed by a processor, for example, any method mentioned in the implementations of the present application is executed by the processor by invoking corresponding instructions stored in a memory. Details are not described below again.

A person of ordinary skill in the art may understand that all or some operations for implementing the foregoing method embodiments are achieved by a program by instructing related hardware; the foregoing program can be stored in a computer-readable storage medium; when the program is executed, operations including the foregoing method embodiments are executed. Moreover, the foregoing storage medium includes at least one medium capable of storing a program code such as an ROM, an RAM, a magnetic disk, or an optical disk.

Figure 3:
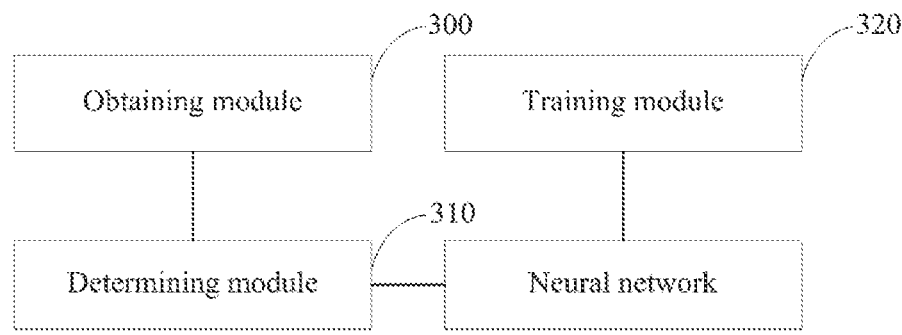
FIG. 3 is a schematic structural diagram of an apparatus for determining a bounding box of a target object in some implementations of the present application.

FIG. 3 is a schematic structural diagram of an apparatus for determining a bounding box of a target object in some implementations of the present application. The apparatus of the implementations may be used for implementing the foregoing method implementations of the present application.

As shown in FIG. 3, the apparatus of the implementations includes an obtaining module 300 and a determining module 310. Optionally, the apparatus further includes a training module 320.

The obtaining module 300 is configured to obtain attribute information of each of a plurality of key points of a target object.

Optionally, reference is made to related descriptions for S100 in the foregoing method implementations for the content of the target object, the key points, the valid key point, and the attribute information of the key points. Descriptions are not made herein in detail.

In an optional example, the apparatus of the implementations of the present application is suitable for an application scenario where the attribute information of the key points of the target object has been successfully obtained. That is to say, in an application scenario where the attribute information of the key points of the target object has been obtained from an image, the obtaining module 300 directly obtains the existing attribute information of the key points of the target object by means of information reading and the like.

The determining module 310 is configured to determine a bounding box position of the target object according to the attribute information of each of the plurality of key points of the target object obtained by the obtaining module 300 and a preset neural network.

Optionally, reference is made to related descriptions in the foregoing method implementations for the representation manner of the neural network (such as the number of layers, the number of neurons, and the activation function) of the present application. Descriptions are not made herein in detail.

In an optional example, the determining module 310 includes a first sub-module, a second sub-module, and a third sub-module. The first sub-module is configured to determine at least one valid key point from the plurality of key points according to the attribute information of each of the plurality of key points obtained by the obtaining module 300. The second sub-module is configured to process, according to attribute information of each of the at least one valid key point determined by the first sub-module, the attribute information of the plurality of key points to obtain processed attribute information of the plurality of key points. The third sub-module is configured to input the processed attribute information of the plurality of key points obtained by the second sub-module to the preset neural network for processing to obtain the bounding box position of the target object.

Optionally, the processed attribute information of the plurality of key points includes processed attribute information of each of the at least one valid key point and attribute information of key points other than the at least one valid key point in the plurality of key points.

Optionally, the second sub-module includes a first unit and a second unit. The first unit is configured to determine a reference coordinate according to coordinate information included in the attribute information of each of the at least one valid key point determined by the first sub-module. For example, the first unit performs averaging processing on coordinates corresponding to the coordinate information of each of the at least one valid key point to obtain the reference coordinate. The second unit is configured to determine coordinate information in the processed attribute information of each valid key point according to the reference coordinate determined by the first unit and to the coordinate information in the attribute information of each of the at least one valid key point. For example, the second unit determines, with the reference coordinate determined by the first unit as an origin point, processed coordinate information corresponding to the coordinate information of each of the at least one valid key point. In this case, the third sub-module is configured to: input the attribute information of the plurality of key points processed by the second unit to the neural network for processing to obtain output position information; and determine the bounding box position of the target object according to the reference coordinate and the output position information.

In an optional example, in the case that it is needed to perform zero-mean processing on the two-dimensional coordinates of the key points of the target object, the first unit is configured to calculate a two-dimensional coordinate means according to coordinate information of all valid key points of the target object, the second unit is configured to respectively calculate, for all the valid key points of the target object, the difference between the coordinate information of the key points and the two-dimensional coordinate means, and use the difference as the coordinate information of the valid key points, and the third sub-module is configured to provide the coordinate information of all the key points of the target object and the presence determination values of all the key points to the neural network as input information.

In the case that the determining module 310 performs zero-mean processing on the two-dimensional coordinates of the key points of the target object, the determining module 310 uses a sum of the bounding box coordinate information output by the neural network and the coordinate means as the two-dimensional coordinate information of the bounding box of the target object.

The training module 320 is configured to train a neural network by obtaining a sample set including a plurality pieces of sample data, where the sample data includes attribute information of a plurality of key points of a sample object, and the sample data is annotated with a bounding box position of the sample object, and training the neural network according to the attribute information of the plurality of key points of the sample object in each piece of sample data and to the bounding box position of the sample object.

In an optional example, the training module 320 obtains a plurality pieces of sample data from the sample set, calculates a coordinate mean for each piece of sample data according to coordinate information of all valid key points of the piece of sample data, respectively calculate the difference between the coordinate information of at least one valid key point in the piece of sample data and the coordinate means, uses the calculated difference as the coordinate information of the corresponding valid key point, and then provides the attribute information of all the key points of the pieces of sample data to the neural network as an input. Reference is made to the descriptions in the forgoing method implementations for an example of an operation performed by the training module 320 for training the neural network. Descriptions are not made herein repeatedly.

Figure 4:
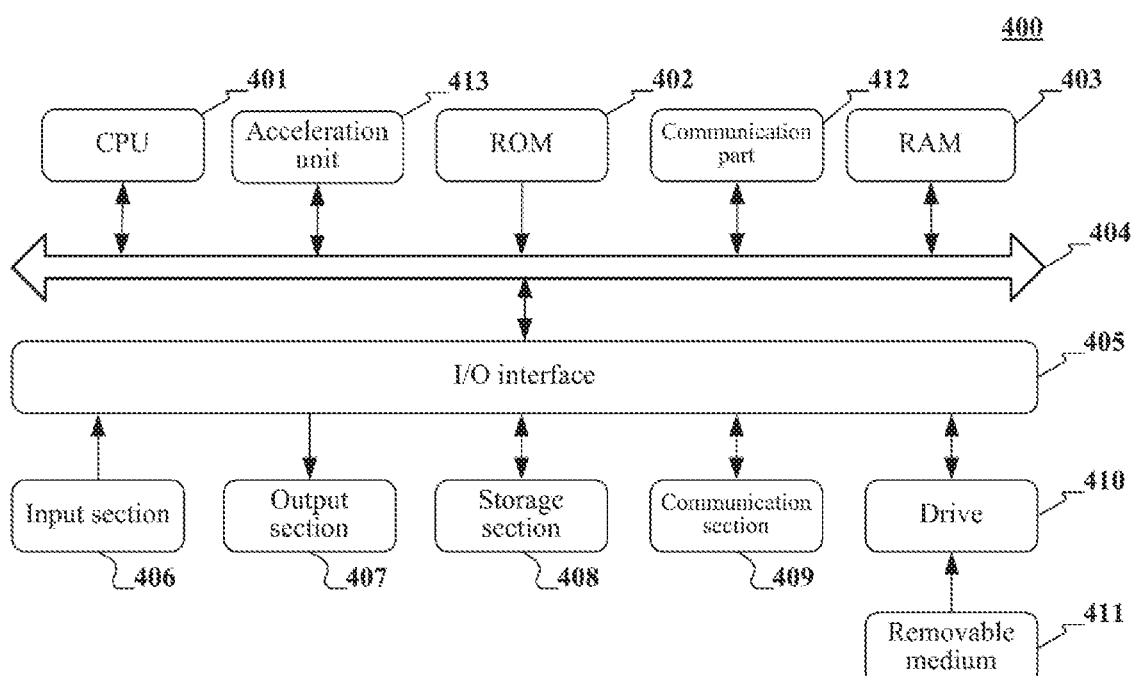
FIG. 4 is a schematic structural diagram of an electronic device in some implementations of the present application.

The implementations of the present application further provide an electronic device which may be, for example, a mobile terminal, a Personal Computer (PC), a tablet computer, a server, or the like. Referring to FIG. 4 below, a schematic structural diagram of an electronic device 400, which may be a terminal device or a server, suitable for implementing the implementations of the present application is shown. As shown in FIG. 4, the electronic device 400 includes one or more processors, a communication part, and the like. The one or more processors are, for example, one or more Central Processing Units (CPUs) 401, and/or one or more acceleration units 413 or the like. The acceleration units 413 may include but not limited to GPU, FPGA, and other types of special-purpose processors or the like. The processors may execute appropriate actions and processing according to executable instructions stored in a Read-Only Memory (ROM) 402 or executable instructions loaded from a storage section 408 to a Random Access Memory (RAM) 403. The communication part 412 may include, but not limited to, a network interface card. The network interface card includes, but not limited to, an Infiniband (IB) network interface card. The processor may communicate with the ROM 402 and/or the RAM 403, to execute executable instructions. The processor is connected to the communication part 412 via a bus 404, and communicates with other target devices via the communication part 412, thereby implementing corresponding operations in any of the methods provided in the implementations of the present application, for example, obtaining attribute information of each of a plurality of key points of a target object, and determining a bounding box position of the target object according to the attribute information of each of the plurality of key points of the target object and to a preset neural network.

In addition, the RAM 403 further stores various programs and data required for operations of an apparatus. The CPU 401, the ROM 402, and the RAM 403 are connected to each other via the bus 404. In the presence of the RAM 403, the ROM 402 is an optional module. The RAM 403 stores executable instructions, or writes the executable instructions to the ROM 402 during running, where the executable instructions enable the processor 401 to perform corresponding operations of the foregoing communication method. An Input/Output (I/O) interface 405 is also connected to the bus 404. The communication part 412 may be integrated, or may be configured to have a plurality of sub-modules (for example, a plurality of IB network interface cards) connected to the bus.

The following components are connected to the I/O interface 405: an input section 406 including a keyboard, a mouse, or the like; an output section 407 including a Cathode-Ray Tube (CRT), a Liquid Crystal Display (LCD), a speaker, or the like; the storage section 408 including a hard disk, or the like; and a communication section 409 of a network interface card including an LAN card, a modem, or the like. The communication section 409 performs communication processing via a network such as the Internet. A drive 410 is also connected to the I/O interface 405 according to requirements. A removable medium 411 such as a magnetic disk, an optical disk, a magneto-optical disk, a semiconductor memory or the like is mounted on the drive 410 according to requirements, so that a computer program read from the removable medium is installed on the storage section 408 according to requirements.

It should be noted that, the architecture shown in FIG. 4 is merely an optional implementation. During specific practice, the number and types of the components in FIG. 4 may be selected, decreased, increased, or replaced according to actual requirements. Different functional components may be separated or integrated or the like. For example, the acceleration unit 413 and the CPU 401 may be separated, or the acceleration unit 413 may be integrated on the CPU 401, and the communication part may be separated from or integrated on the CPU 401 or the acceleration unit 413 or the like. These alternative implementations all fall within the scope of protection of the present application.

Particularly, the process described above with reference to the flowchart according to the implementations disclosed in the present application may be implemented as a computer software program. For example, the implementations of present application include a computer program product. The computer program product includes a computer program tangibly included in a computer-readable medium. The computer program includes a program code for executing a method shown in the flowchart. The program code may include instructions for correspondingly executing steps of the method provided in the implementations of the present application, for example, obtaining attribute information of each of a plurality of key points of a target object, and determining a bounding box position of the target object according to the attribute information of each of the plurality of key points of the target object and to a preset neural network. In such implementations, the computer program is downloaded and installed from the network through the communication section 409, and/or is installed from the removable medium 411. The instructions in the computer program, when being executed by the CPU 401, executes the foregoing functions defined in the methods of the present application.

Figure 5:
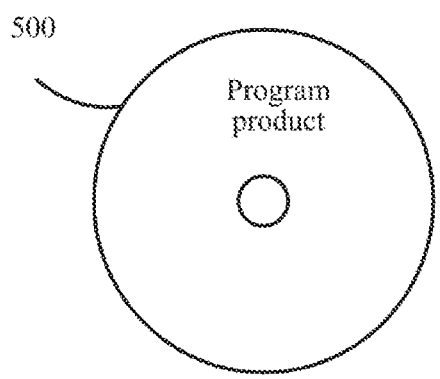
FIG. 5 is a schematic diagram of a computer storage medium in some implementations of the present application.

The methods, apparatuses, and devices in the present application may be implemented in many manners. For example, the methods, apparatuses, and devices in the present application are implemented with software, hardware, firmware, or any combination of software, hardware, and firmware. The foregoing sequence of steps of the method is merely for description, and unless otherwise stated particularly, the foregoing specifically described sequence is not intended to limit the steps of the method in the present application. In addition, in some implementations, the present application is also implemented as programs recorded in a recording medium. The programs include computer-readable instructions for implementing the methods according to the present application. Therefore, the present application further covers the recording medium storing the programs for executing the methods according to the present application, for example, the computer-readable storage medium 500 shown in FIG. 5.

The methods, apparatuses, electronic devices, and computer-readable storage media according to the present application may be implemented in many manners. For example, the methods, apparatuses, electronic devices and computer-readable storage media according to the present application may be implemented by using software, hardware, firmware, or any combination of software, hardware, and firmware. The foregoing sequence of steps of the method is merely for description, and unless otherwise stated particularly, the foregoing specifically described sequence is not intended to limit the steps of the method in the present application. In addition, in some implementations, the present application is also implemented as programs recorded in a recording medium. The programs include computer-readable instructions for implementing the methods according to the present application. Therefore, the present application further covers the recording medium storing the programs for performing the methods according to the present application.

The descriptions of the present application are provided for the purpose of examples and description, and are not intended to be exhaustive or limit the present application to the disclosed form. Many modifications and changes are obvious to persons of ordinary skill in the art. The implementations are selected and described to better describe a principle and an actual application of the present application, and to make a person of ordinary skill in the art understand the present application, so as to design various implementations with various modifications applicable to particular use.

The invention claimed is:

1. A method for determining a bounding box of a target object, comprising:
obtaining attribute information of each of a plurality of key points of a target object;
determining a bounding box position of the target object based on the attribute information of each of the plurality of key points of the target object and a preset neural network;
wherein the attribute information of each of the plurality of key points comprises coordinate information and a presence determination value;
wherein the determining the bounding box position of the target object based on the attribute information of each of the plurality of key points of the target object and the preset neural network comprises:
determining at least one valid key point from the plurality of key points according to the attribute information of each of the plurality of key points,
processing, according to the attribute information of each of the at least one valid key point, the attribute information of the plurality of key points to obtain processed attribute information of the plurality of key points, and
inputting the processed attribute information of the plurality of key points to the preset neural network for processing to obtain the bounding box position of the target object; and
wherein the processed attribute information of the plurality of key points comprises processed attribute information of each of the at least one valid key point, and attribute information of key points other than the at least one valid key point in the plurality of key points.

2. The method according to claim 1, wherein processing, according to the attribute information of each of the at least one valid key point, the attribute information of the plurality of key points to obtain processed attribute information of the plurality of key points comprises:
determining a reference coordinate according to coordinate information comprised in the attribute information of each of the at least one valid key point; and
determining coordinate information in the processed attribute information of each valid key point according to the reference coordinate and to the coordinate information in the attribute information of each of the at least one valid key point.

3. The method according to claim 2, wherein determining the reference coordinate according to coordinate information comprised in the attribute information of each of the at least one valid key point comprises:
performing averaging processing on coordinates corresponding to the coordinate information of each of the at least one valid key point to obtain the reference coordinate, and/or
determining the coordinate information in the processed attribute information of each valid key point according to the reference coordinate and to the coordinate information in the attribute information of each of the at least one valid key point comprises:
determining, with the reference coordinate as an origin point, processed coordinate information corresponding to the coordinate information of each of the at least one valid key point.

4. The method according to claim 2, wherein inputting the processed attribute information of the plurality of key points to the preset neural network for processing to obtain the bounding box position of the target object comprises:
inputting the processed attribute information of the plurality of key points to the preset neural network for processing to obtain output position information; and
determining the bounding box position of the target object according to the reference coordinate and the output position information.

5. The method according to claim 1, wherein the neural network comprises at least two full connection layers.

6. The method according to claim 1, wherein the neural network comprises three full connection layers, wherein an activation function of at least one of the first full connection layer and the second full connection layer of the three full connection layers comprises a Rectified Linear Unit (ReLu) activation function.

7. A non-transitory computer-readable storage medium having instructions stored thereon, wherein the instructions upon execution by a processor cause the processor to perform operations comprising:
obtaining attribute information of each of a plurality of key points of a target object;
determining a bounding box position of the target object based on the attribute information of each of the plurality of key points of the target object and a preset neural network;
wherein the attribute information of each of the plurality of key points comprises coordinate information and a presence determination value;

wherein the determining the bounding box position of the target object based on the attribute information of each of the plurality of key points of the target object and the preset neural network comprises:
  determining at least one valid key point from the plurality of key points according to the attribute information of each of the plurality of key points,
  processing, according to the attribute information of each of the at least one valid key point, the attribute information of the plurality of key points to obtain processed attribute information of the plurality of key points, and
  inputting the processed attribute information of the plurality of key points to the preset neural network for processing to obtain the bounding box position of the target object; and
wherein the processed attribute information of the plurality of key points comprises processed attribute information of each of the at least one valid key point, and attribute information of key points other than the at least one valid key point in the plurality of key points.

8. An electronic device comprising:
a processor; and
a computer-readable storage medium having stored thereon instructions that, when executed by the processor, cause the processor to:
  obtain attribute information of each of a plurality of key points of a target object;
  determine a bounding box position of the target object according to the attribute information of each of the plurality of key points of the target object and a preset neural network;
  wherein the attribute information of each of the plurality of key points comprises coordinate information and a presence determination value;
  wherein the determining the bounding box position of the target object based on the attribute information of each of the plurality of key points of the target object and the preset neural network comprises:
    determining at least one valid key point from the plurality of key points according to the attribute information of each of the plurality of key points,
    processing, according to the attribute information of each of the at least one valid key point, the attribute information of the plurality of key points to obtain processed attribute information of the plurality of key points, and
    inputting the processed attribute information of the plurality of key points to the preset neural network for processing to obtain the bounding box position of the target object; and
  wherein the processed attribute information of the plurality of key points comprises processed attribute information of each of the at least one valid key point, and attribute information of key points other than the at least one valid key point in the plurality of key points.

9. The electronic device according to claim 8, wherein processing, according to the attribute information of each of the at least one valid key point, the attribute information of the plurality of key points to obtain processed attribute information of the plurality of key points comprises:
  determining a reference coordinate according to coordinate information comprised in the attribute information of each of the at least one valid key point; and
  determining coordinate information in the processed attribute information of each valid key point according to the reference coordinate and to the coordinate information in the attribute information of each of the at least one valid key point.

10. The electronic device according to claim 9, wherein determining the reference coordinate according to coordinate information comprised in the attribute information of each of the at least one valid key point comprises:
  performing averaging processing on coordinates corresponding to the coordinate information of each of the at least one valid key point to obtain the reference coordinate, and/or
  determining the coordinate information in the processed attribute information of each valid key point according to the reference coordinate and to the coordinate information in the attribute information of each of the at least one valid key point comprises:
  determining, with the reference coordinate as an origin point, processed coordinate information corresponding to the coordinate information of each of the at least one valid key point.

11. The electronic device according to claim 9, wherein inputting the processed attribute information of the plurality of key points to the preset neural network for processing to obtain the bounding box position of the target object comprises:
  inputting the processed attribute information of the plurality of key points to the preset neural network for processing to obtain output position information; and
  determining the bounding box position of the target object according to the reference coordinate and the output position information.

12. The electronic device according to claim 8, wherein the neural network comprises at least two full connection layers.

13. The electronic device according to claim 8, wherein the neural network comprises three full connection layers, wherein an activation function of at least one of the first full connection layer and the second full connection layer of the three full connection layers comprises a Rectified Linear Unit (ReLu) activation function.

* * * * *